Aug. 18, 1959  K. A. BOWEN  2,899,748
INSTRUMENT FOR INSCRIBING AN ELLIPSE
Filed Nov. 15, 1957
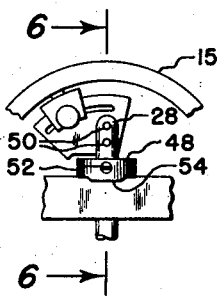
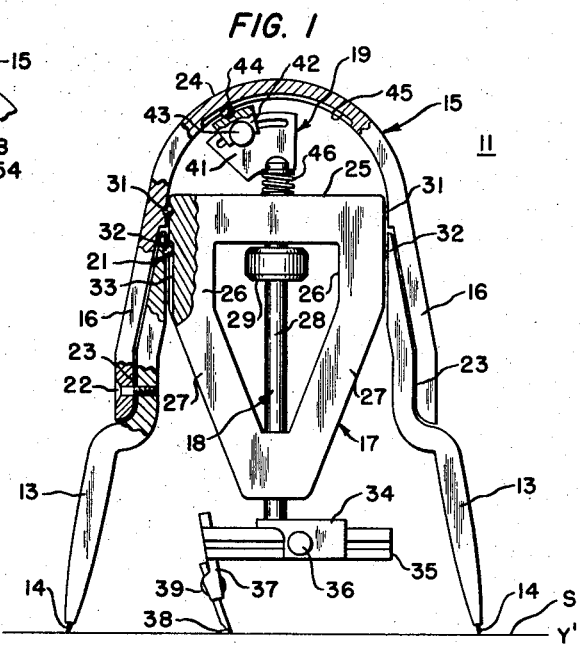
INVENTOR.
KERMIT A. BOWEN
BY Fulwider, Mattingly
and Huntley ATTORNEYS

United States Patent Office 2,899,748
Patented Aug. 18, 1959

2,899,748

INSTRUMENT FOR INSCRIBING AN ELLIPSE

Kermit A. Bowen, La Mesa, Calif., assignor of three percent to Robert A. Sage and Cleo B. Sage, La Mesa, Calif., and by court decree, twenty-five percent to Howard E. Rector Application November 15, 1957, Serial No. 696,852

7 Claims. (Cl. 33—30)

The present invention relates to an instrument for inscribing an ellipse upon a surface, and more particularly to such an instrument wherein adjustments may be made to inscribe an ellipse having major and minor axes of predetermined lengths.

Heretofore, drafting instruments and ellipsographs for producing ellipses have been unsatisfactory for various reasons, including their expense, complexity, and unwieldy nature. The technical shortcomings of such instruments is particularly apparent in those cases wherein adjustments in the minor and major axes of the ellipse are desired. For example, in technical illustration work it is often important to show an article or device in perspective at various angles of projection, and an inexpensive, simple and expeditious means for accomplishing such showings would be of considerable benefit.

Accordingly, the instrument of the present invention is provided to accomplish these objectives. It is compact; it affords ease of adjustment of the lengths of the major and minor axes; and it is relatively inexpensive to manufacture. The instrument, if desired, may also be used as a compass for drawing circles. However, it is particularly adapted for use in inscribing ellipses on a surface and it is mainly in this connection that the instrument will be described.

Essentially, the device comprises an inscriber rotatably carried in a mount which is pivotally secured to suitable support structure. The inscriber, which may carry either a pen or a pencil, is effective upon rotation to trace a circle having a radius dictated by the amount by which the inscriber is offset from the axis of rotation of the shaft upon which it is carried. This rotation of the inscriber is combined with pivotal movement of the mount to produce the ellipse. A further refinement, which will be described in detail hereinafter, provides for an additional pivotal displacement of the inscriber by reason of, in effect, a change in the locations of elements of the support structure, thereby altering the location of the pivot point of the mount with respect to the inscribed surface. Guidance of the inscriber during these movements is provided by manually tilting the support structure toward the direction taken by the inscriber, and it will be understood that, simultaneously, the draftsman or operator is also rotating the shaft or the like to which the inscriber is coupled.

Further objects and advantages will be apparent from the following description, reference being had to the accompanying drawings wherein a preferred embodiment of the invention is illustrated.

In the drawings:

Fig. 1 is a front elevational view of the instrument of the present invention, portions thereof being shown in cross-section for clarity;

Fig. 2 is a side view through the middle of the instrument of Fig. 1 after rotation of the inscribing means through 90 degrees;

Fig. 3 is an end elevational view of the inscribing means;

Fig. 4 is a typical ellipse such as would be inscribed by the present instrument;

Fig. 5 is a fragmentary view, similar to Fig. 1, of a modification of the instrument; and Fig. 6 is a view partly in section, the section being taken on line 6—6 of Fig. 5.

Referring to the drawings, and to Figs. 1 and 2 in particular, there is illustrated an instrument, generally designated 11, which is adapted to inscribe an ellipse 12, Fig. 4, upon a surface S. Ellipse 12 is characterized by a major axis X—X' and a minor axis Y—Y' intersecting at O.

Instrument 11 comprises, generally, a pair of supporting elements 13, preferably arranged in downwardly diverging relation and spaced apart as illustrated. Elements 13 have suitable pointed ends 14 which may be pressed into the surface S upon which ellipse 12 is to be inscribed, these ends 14 being arranged along minor axis Y—Y' so that they straddle the ellipse. Instrument 11 also comprises suspension means 15, having a pair of legs 16 which are pivotally mounted, respectively, to supporting elements 13; a frame 17 is pivotally mounted at its sides to both elements 13 and legs 16, as will be more particularly described hereinafter; inscriber means 18 is rotatably carried by frame 17 and is translatably pivotable therewith; cam means 19 couples frame 17 to inscriber means 18; and means 21 provides a sliding pivot point between frame 17 and elements 13.

Legs 16 of suspension means 15 are pivotally mounted at their lower ends to approximately the mid portion of elongated supporting elements 13 by a pair of usual machine screws, one of which is illustrated at 22. A spring washer 23 is preferably disposed about each screw 22 between elements 13 and legs 16 to prevent the development of overly free pivotal movement therebetween.

Suspension means 15 includes an integral yoke or arch portion 24 which connects legs 16 and forms a comparatively rugged and durable support for frame 17, and, as will be seen, is instrumental in affording a camming, pivotal movement between means 15 and frame 17.

Frame 17 includes a horizontal member 25 integrally formed into a pair of depending side members 26 which are substantially vertically disposed and integrally extended into convergent members 27. These members 27 are joined at their lower ends to form a lower bearing or journal for a vertically disposed shaft 28 of inscriber means 18. An upper journal for shaft 28 is provided through the middle of horizontal member 25, and in this manner shaft 28 is fixed for rotation about a vertically extending axis disposed through the center of frame 17. Rotation of shaft 28 may conveniently be had by manually rotating a knob 29 fixedly keyed to shaft 28.

Frame 17 is pivotally mounted at its upper portion adjacent the ends of member 25 by a pair of ball bearings 31. Bearings 31 are carried in well known manner within suitable indentations or pockets provided therefor in frame 17 and in the upper portions of legs 16, as best illustrated in Fig. 1. Thus, frame 17 is pivoted to suspension means 15 along the axis of ball bearings 31, and it is noted that this axis is parallel to and spaced above the axis of screws 22 about which elements 13 and legs 16 pivot.

A traveling pivot between frame 17 and the upper portions of elements 13 is afforded by means 21 which comprises a pair of ball bearings 32 held in suitable grooved sockets, respectively, of elements 13 and arranged to slide in guide tracks, races, or grooves 33 which extend vertically along the outer edges of members 26 and parallelly of the axis of inscriber means 18, as viewed in Fig. 1. The novel function of this traveling pivot will become more readily apparent hereinafter.

Inscriber means 18, Fig. 3, includes the above-mentioned shaft 28; a clamp 34 fixedly carried at the lower end of shaft 28. Means 18 also includes a foot 35 slidable within clamp 34 and adapted to be fixed with respect to clamp 34 by a usual set screw 36. The outer end of the foot 35 is provided with a vertically extending slit for receiving an inscriber clamp 37. This inscriber clamp 37 is held in position by a clamping screw 39 which serves to support a pen or pencil point 38 in position upon surface S.

By loosening set screw 36, and urging foot 35 outwardly away from the vertical axis of shaft 28, point 38 may be adjustably positioned so that upon rotation of shaft 28 circles of various diameters may be inscribed by point 38, provided ball 44 is at zero or neutral position. This permits use of instrument 11 as a compass if desired.

The rotational movement of inscribing means 18 may be combined with pivotal movement of frame 17, as will be seen, whereby point 38 generates an ellipse having a minor axis of a length substantially equivalent to twice the distance between point 38 and the axis of shaft 28.

The length of the major axis of ellipse 12 is controlled by cam means 19 which includes a slotted arcuate plate 41 fixed to the upper end of shaft 28, a ball bearing support 42, and a clamp screw 43 disposed through support 42 and the slot of plate 41 for securing support 42 in any desired position along the arc defined by support 42.

Support 42 of cam means 19 is provided with a socket for carrying a ball bearing 44, and an arc-like groove or race 45 is provided in the underside of arch member 24 for accepting the upper portion of ball 44. The axis of the race lies midway of a line intersecting bearings 31. It will be apparent that with support 42 adjusted so that ball 44 is spaced from the axis of shaft 28, that is, off neutral, a relative pivotal movement will occur between frame 17 and the ball 44 upon rotation of shaft 18. This pivotal movement is zero when ball 44 is in line with shaft 18, and becomes increasingly greater as ball 44 is adjusted away from the axis of shaft 18, thereby generating ellipses having increasingly longer major axes. A helical compression spring 46 is disposed about shaft 18 between plate 41 and member 25 to insure cooperation of ball 44 with race 45, and also to provide for varying pressure of point 38 against surface S.

The provision of means 21 affords a correction for preventing the generation of ellipses having overly full end portions, which might otherwise occur, with pivotal support of frame 17 only at pivots 31. More particularly, it has been found that as an ellipse is formed by the present instrument the ellipse ends would be somewhat blunted without the provision of pivots 22 and 32, which serve in effect to advance frame 17 along the line of major axis X—X' an amount additional to that afforded by the pivotal movement of frame 17 induced by cam means 19. Satisfactory vertical distances between the pivotal axes for generating a substantially true or ideal ellipse may be determined by trial and error. By way of example, the distances between the pivotal axes have been found in one embodiment to operate satisfactorily if they are as follows (all distances being vertically measured with the components of instrument 11 in neutral positions): Between the axes of balls 31 and 32, .60 inch; and between the axes of balls 31 and screws 22, 2.10 inches.

In operation, instrument 11 is placed by the draftsman upon surface S with pointed ends 14 disposed upon extensions of minor axes Y—Y'. The minor axis lengths is selected by adjusting inscriber means 18, and the major axis length is selected by adjusting the position of ball 44 in race 45. Next, knob 29 is manipulated to rotate shaft 28 through 90 degrees, for example, thereby moving the components of instrument 11 from the positions of Fig. 1 to those of Fig. 2 and along the path X'—Y' of Fig. 4. During this rotation of knob 29 the draftsman pivots instrument 11 about ends 14 to follow the elliptical travel of inscriber point 38 in the direction of the major axis X—X'. Rotation of shaft 28 is then continued until the full ellipse 12 is generated.

Instead of the spring 46, as is embodied in Figs. 1 to 3, I provide a collar 48. In this embodiment, the shaft 28 is secured to the cam 19 by rivets 50. The collar is held in position by a set screw 52. This collar is adjusted so that the shaft can move longitudinally of its axis, i.e., there is approximately 1/32 of an inch play between the ball 44 and the upper part of groove 45, adjacent the ball, when the points 14—38—14 are aligned as in Fig. 1. The collar is provided with two camming surfaces 54 on the bottom thereof which are arranged to engage the upper surface of horizontal member 25 of frame 17 as the frame is rotated. The camming surfaces 54 are disposed on opposite sides of a vertical plane which intersects, at 90 degrees, a vertical plane extending through the axis of shaft 28 and the inscriber point 38. The camming surfaces are of such length that they are effective for raising the shaft 28 at approximately 80 degrees from the position shown in Fig. 1 for approximately 10 degrees on each side of the major axis X—X'. I have found that there is a slight tendency for undesirable drag of the point 38 while it is being moved through the extreme ends of the major axis, i.e., during 10 degree movements on each side of line X—X'. This dragging or binding is relieved by camming the frame upwardly during both 20 degree moveemnts on opposite sides of X and X'.

From the above it will be apparent that the present invention provides an instrument 11 which is effective to generate ellipses quickly and simply, and which is operative to permit easy adjustment of the lengths of the major and minor axes of such ellipses. This combination of functions and structure within one device produces a compact and lightweight construction which is relatively simple to manufacture and which is reliable in operation.

While the form of embodiment herein shown and described constitutes a preferred form, it is to be understood that other forms may be adopted falling within the scope of the claims that follow.

I claim:

1. An instrument for inscribing an ellipse upon a surface, said instrument comprising support means having side portions connected by an intermediate portion and ends for resting upon said surface, a frame pivotally mounted to said side portions and constrained against rotational movement with respect to said side portions, inscriber means rotatably carried by said frame and including an inscriber offset from the axis of rotation thereof, said inscriber means being pivotable with said frame, and means coupling said inscriber means and said intermediate portion for providing relative pivotal movement between said support means and said frame upon rotation of said inscriber means whereby the combined pivotal movement of said frame and the rotational movement of said inscriber means causes elliptical movement of said inscriber with respect to said surface.

2. An instrument for inscribing an ellipse upon a surface, said instrument comprising a pair of elongated supporting elements having lower ends arranged to rest upon said surface along the minor axis of the ellipse to be inscribed, suspension means having a pair of legs pivotally mounted at their lower portions to said supporting elements, a frame pivotally mounted to said pair of legs at the upper portions thereof, inscriber means rotatably carried by said frame and pivotable with said frame along the major axis of said ellipse, cam means coupling said inscriber means and said suspension means for providing relative pivotal movement between said suspension means and said frame upon rotation of said inscriber means, and means slidably coupling said supporting elements and said frame adjacent the upper portions of said supporting elements to thereby effect relative pivotal movement between said supporting elements and said suspension means in increments bearing a predetermined relationship to increments of pivotal movement between said frame and said suspension means whereby said inscriber means is advanced along the major axis of said ellipse by both pivotal movement of said frame and of said supporting elements with respect to said suspension means.

3. An instrument comprising a pair of elongated supporting elements, suspension means having a pair of legs connected together by an arch portion, said legs being mounted to said supporting elements for relative pivotal movement therebetween about a first axis, a frame mounted to said pair of legs for relative pivotal movement therebetween about a second axis spaced from and parallel to said first axis, inscriber means rotatably carried by said frame, means carried by said inscriber means and engageable with said arch portion and operative to effect relative pivotal movement between said suspension means and said frame about said second axis upon rotation of said inscriber means, and means engageable with said supporting elements and said frame and operative to effect relative pivotal movement between said suspension means and said supporting elements about a third axis intermediate said first axis and said second axis upon relative pivotal movement between said frame and said suspension means.

4. An instrument comprising a pair of elongated supporting elements, suspension means having a pair of legs connected together by an arch portion having a guide track formed therein, said legs being mounted to said supporting elements for relative pivotal movement therebetween about a first axis, a frame mounted to said pair of legs for relative pivotal movement therebetween about a second axis spaced from and parallel to said first axis, inscriber means rotatably carried by said frame, a guide element movable in said guide track, and means carried by said inscriber means for supporting said guide element at a predetermined offset from the axis of rotation of said inscriber means whereby rotation of said inscriber means is effective to cause relative pivotal movement between said frame and said suspension means.

5. An instrument for inscribing an ellipse upon surface, said instrument comprising support means having side portions connected by an intermediate portion and ends for resting upon said surface, a frame pivotally mounted to said side portions and constrained against rotational movement with respect to said side portions, inscriber means rotatably carried by said frame and including an inscriber offset from the axis of rotation thereof, said inscriber means being pivotable with said frame, and means coupling said inscriber means and said intermediate portion for providing relative pivotal movement between said support means and said frame upon rotation of said inscriber means whereby the combined pivotal movement of said frame and the rotational movement of said inscriber means causes elliptical movement of said inscriber with respect to said surface, said inscriber means being longitudinally movable relative the frame, and a cam between the inscriber means and the frame for imparting relative upward movement to the inscriber during a part of the rotation thereof.

6. An instrument for inscribing an ellipse upon a surface, said instrument comprising support means having side portions connected by an intermediate portion and ends for resting upon said surface, a frame pivotally mounted to said side portions and constrained against rotational movement with respect to said side portions, inscriber means rotatably carried by said frame and including an inscriber offset from the axis of rotation thereof, said inscriber means being pivotable with said frame, and means coupling said inscriber means and said intermediate portion for providing relative pivotal movement between said support means and said frame upon rotation of said inscriber means whereby the combined pivotal movement of said frame and the rotational movement of said inscriber means causes elliptical movement of said inscriber with respect to said surface, said inscriber means being longitudinally movable relative the frame, and a cam between the inscriber means and the frame and disposed on opposite sides of a vertical plane intersecting at 90 degrees a vertical plane extending through the axis of the inscriber means and the inscriber.

7. An instrument for inscribing an ellipse upon a surface, said instrument comprising suspension means having a pair of laterally spaced support means having lower ends arranged to rest upon said surface along the minor axis of the ellipse to be inscribed, said suspension means including a laterally disposed race, a frame pivotally mounted to said pair of support means at the upper portions thereof, inscriber means rotatably carried by said frame and pivotable with said frame along the major axis of said ellipse, and cam means coupling said inscriber means and said suspension means, said cam means including an element carried by said inscriber means and adjustably movable toward and away from the axis of rotation of said inscriber means, said element being adapted to travel laterally in said race for providing relative pivotal movement between said suspension means and said frame upon rotation of said inscriber means whereby the combined pivotal movement of said frame and the rotational movement of said inscriber means causes elliptical movement of said inscriber with respect to said surface.

References Cited in the file of this patent

UNITED STATES PATENTS

| 1,626,430 | Sanders | Apr. 26, 1927 |

FOREIGN PATENTS

| 54,886 | Switzerland | Jan. 27, 1912 |